United States Patent [19]

Hasegawa et al.

[11] 3,871,987

[45] Mar. 18, 1975

[54] APPARATUS FOR REMOVING ACID GAS FROM WASTE GAS

[76] Inventors: Tsuneo Hasegawa, Shimouchikahara-cho, 46-banchi, Koyama, Kita-ku, Kyoto-shi, 603 Kyoto-fu; Kiyoharu Nakahara, Gakuendaiwa-cho, 5-chome, 631 Nara-shi, both of Japan

[22] Filed: Feb. 14, 1974

[21] Appl. No.: 442,455

[30] Foreign Application Priority Data
Feb. 16, 1973  Japan.............................. 48-19460
Feb. 17, 1973  Japan.............................. 48-19466
Feb. 17, 1973  Japan.............................. 48-19467
Feb. 19, 1973  Japan.............................. 48-20372

[52] U.S. Cl.................. 204/263, 204/265, 204/266
[51] Int. Cl............................................. C22d 1/02
[58] Field of Search........... 204/257, 263, 265–266, 204/130

[56] References Cited
UNITED STATES PATENTS
3,485,743  12/1969  Mayland et al..................... 204/263
3,661,762   5/1972  Parsi................................... 204/257
3,753,881   8/1973  Zabolotny.......................... 204/130

*Primary Examiner*—R. L. Andrews
*Attorney, Agent, or Firm*—Edwin E. Greigg

[57] ABSTRACT

The apparatus is used for removing sulfur oxides, nitrogen oxides and like acid gases from various waste gases containing such acid gases.

8 Claims, 2 Drawing Figures

APPARATUS FOR REMOVING ACID GAS FROM WASTE GAS

BACKGROUND OF THE INVENTION

In industries, there is a strong demand for apparatuses for removing acid gases from waste gases which have the advantages of (1) having an excellent ability to capture acid gases for reliable and efficient removal, (2) being free of secondary pollution when treating acid gases, (3) being readily adjustable in accordance with the kind or the variations in the amount of the waste gas, easily operable and amenable to automatic control, and (4) permitting the process of removing acid gases to yield industrially valuable by-products, thereby assuring overall economy.

Typically, conventional apparatuses employ the following absorbents for the absorption of acid gases: (a) alkaline aqueous solution, for example, of sodium hydroxide, sodium sulfite or the like, (b) suspension of lime, (c) aqueous solution of ammonia, (d) concentrated aqueous solution of potassium sulfite, (e) slurry of magnesium and manganese oxides, etc. However, the conventional apparatuses using such absorbents are not fully satisfactory to fulfil the above-mentioned demand.

SUMMARY OF THE INVENTION

The apparatus of this invention differs from the conventional apparatuses in the principle to remove acid gases, as well as being superior thereto in performance, safety, operation, economy and therefore fully satisfies the demand of industries.

The present invention provides an apparatus for removing acid gas from waste gas comprising a first reactor for reacting the acid gas with an alkaline solution of aluminic acid to form a reaction product of the acid gas and aluminum, the first reactor being connected to first conduit means for introducing the waste gas into the reactor, second conduit means for discharging the waste gas after the acid gas has been removed therefrom and third conduit means for discharging the reaction product from the reactor; a first electrolysis device having an aluminum cathode to convert electrolyte in the cathode zone to an alkaline solution of aluminic acid as electrolysis proceeds; and fourth conduit means for introducing into the first reactor the alkaline aluminic acid solution produced in the first electrolysis device.

In this specification, the term "alkaline solution of aluminic acid" means an alkaline solution containing "aluminic acid ions", and the "aluminic acid ion" is anion which is produced by the dissociation of soluble aluminate when it is dissolved in water.

The principle of the apparatus of this invention will be described below. If an aluminum cathode is used for the electrolysis, for example, of common salt water or sodium sulfate solution, the solution in the cathode zone is made highly alkaline due to the formation of sodium hydroxide as the electrolysis proceeds. Subsequently, the aluminum of the electrode dissolves into the solution to form an alkaline solution of aluminic acid. When sulfuric acid gas, nitrogen dioxide gas or like acid gas, for example, is brought into contact with the alkaline aluminic acid solution, the hydrogen exponent (hereafter called pH) of the solution reduces, depositing nascent aluminum hydroxide in the solution. Further contact of the acid gas with the resulting aluminum hydroxide causes neutralization reaction, which gives a reaction product of the acid gas and aluminum, namely aluminum sulfate if the acid gas is sulfuric acid gas, or aluminum nitrate if the gas is nitrogen dioxide. In this way, the acid gas is removed from the waste gas.

Thus according to this invention, acid gas is reacted with nascent aluminum hydroxide resulting from the change of pH of the aluminic acid solution, i.e., with aluminum hydroxide in the form of a slurry which is very reactive and has a high ability to absorb gas, thus assuring efficient and rapid reaction between the acid gas and aluminum hydroxide. Moreover, the acid gas introduced into the solution containing aluminic acid ions changes the ions in phase to gradually yield a slurry of aluminum hydroxide and to thereby increase the viscosity of the aluminum hydroxide solution, consequently improving the effect contact between the acid gas and aluminum hydroxide within the reactor. Accordingly, the present apparatus exhibits the outstanding performance thereby enabling the acid gas to be captured effectively and absorbed efficiently.

Inasmuch as the alkaline solution of aluminic acid is available from an electrolysis device, the present apparatus is adjustable in accordance with variations in the amount of waste gas and with changes in the concentration of acid gas in the waste gas merely by controlling the voltage and amperage of the current applied for electrolysis. Thus the apparatus is operable with ease and free of trouble even by an unskilled operator and automatically operable by simple control means.

Besides, the present apparatus has a characteristic feature in that only metallic aluminum is supplied by means of electrolysis, thereby, the acid gas is reacted with aluminum component easily and surely.

Furthermore, since the removal of acid gas from waste gas entails only the electrolytic generation of hydrogen gas, the treatment of waste gas according to this invention is free of any secondary pollution.

The reaction product of aluminum and acid gas recovered as a by-product, which typically may be aluminum sulfate, is useful as a coagulant for the treatment of a water supply including waste water and thus lends itself to economical operation of the overall apparatus and is therefore very valuable for use in industries in these days when attention is focused on pollution problems.

Accordingly, the principal object of this invention is to provide an apparatus for removing acid gas from waste gas which is excellent in performance, safety, operation and economy.

Another object of this invention is to provide an apparatus capable of effectively removing acid gas from waste gas even if the acid gas is sulfurous gas, nitrogen monoxide or the like by pre-oxidizing such gas to sulfuric acid gas or nitrogen dioxide gas.

Yet another object of this invention is to provide an efficient apparatus by which the oxidizing reaction of the above mentioned sulfurous acid gas or nitrogen monoxide is promoted to remove such acid gas within a short period of time.

Still another object of this invention is to provide an apparatus which is compact in its entirety and which can be manufactured at a reduced cost.

Other objects and advantages of this invention will become apparent from the following description.

DESCRIPTION OF THE PREFERRED EMBODIMENTS

Figure 1:
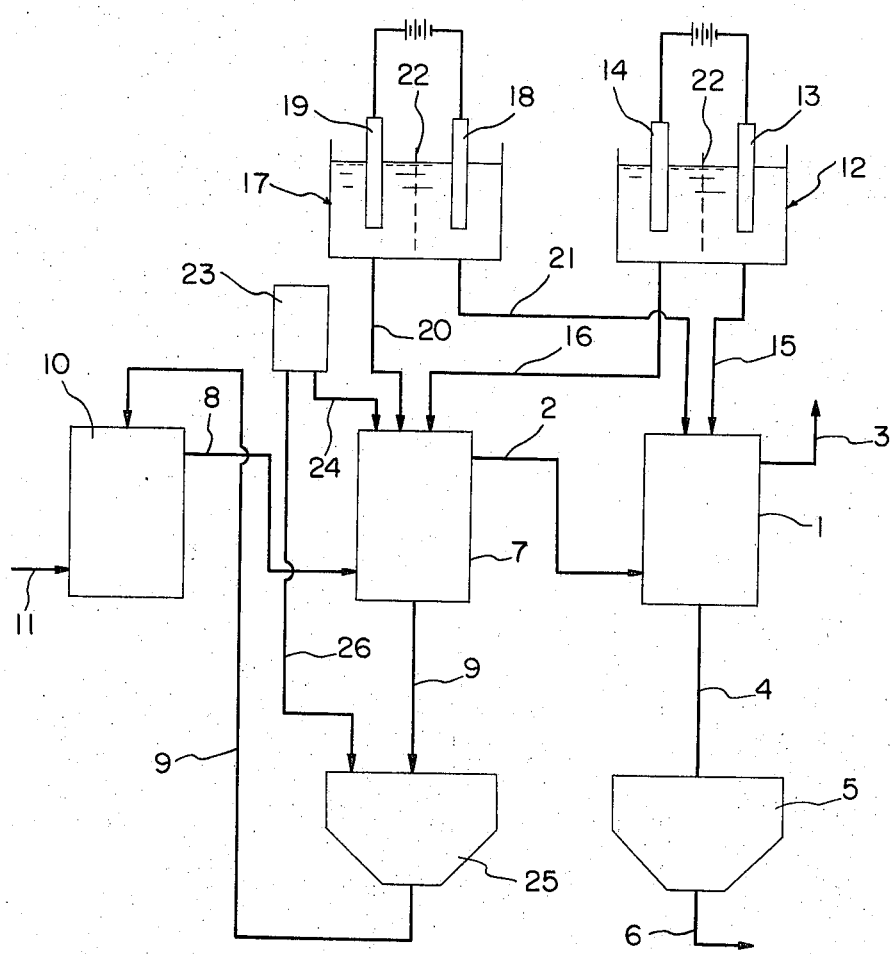
FIG. 1 is a flow sheet showing an embodiment of the apparatus according to this invention.

FIG. 1 shows a first reactor 1 for reacting acid gas in waste gas with an alkaline aluminic acid solution to obtain a reaction product of aluminum and the acid gas. First conduit means 2, second conduit means 3 and third conduit means 4 are connected to the first reactor 1. If the pH of the solution within the first reactor 1 is above 12, the aluminum is in the form of aluminic acid ions, but when waste gas containing acid gas is introduced into the solution through the first conduit means 2, the gas reduces the pH, permitting the aluminic acid ions to undergo phase change to nascent aluminum hydroxide in the pH range of about 4.1 to 12. Subsequently, the aluminum hydroxide reacts with the acid gas to form $Al_2(SO_4)_3$ if the acid gas is $SO_3$ for example, or $Al(NO_3)_3$ if it is $NO_2$. After acid gas has been removed in this way, the waste gas is released into the atmosphere through the second conduit means 3. On the other hand, the reaction product of aluminum and acid gas is sent to concentrating means 5 through the third conduit means 4, and the concentrated product is discharged through twelfth conduit means 6.

A second reactor 7 connected by the first conduit means 2 to the first reactor 1 is provided to pre-oxidize the acid gas in the waste gas. It is necessary mainly when the acid gas is sulfurous acid gas or nitrogen monoxide gas but can be omitted if the acid gas is sulfuric acid gas, hydrogen chloride gas, hydrogen fluoride gas, chlorine gas or hydrogen fluoride gas. Connected to the second reactor 7 are fifth conduit means 8 for supplying the waste gas to the reactor 7 and sixth conduit means 9 for discharging a residue remaining in the reactor 7 after reaction. The other end of the fifth conduit means 8 is connected to a dust remover 10. The waste gas introduced through the 11 conduit means 11 into the dust remover is subjected to gas-liquid contact therein, whereby soot and like solids are removed therefrom while the gas is being cooled. In some cases, the dust remover may be omitted.

With reference to FIG. 1, a first electrolysis device 12 has an aluminum cathode 13 and a carbon anode 14 for the electrolysis of common salt water. As electrolysis proceeds, the solution in the zone of cathode 13 becomes alkaline due to the formation of sodium hydroxide, permitting the aluminum electrode to dissolve into the solution to produce aluminic acid ions when the pH exceeds 12. The alkaline solution of aluminic acid is introduced into the first reactor 1 through fourth conduit means 15. The solution in the zone of anode 14 turns into chlorine water, bringing about the following equilibrium state:

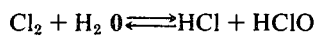

Thus highly oxidative hypochlorous acid HClO is formed. The solution containing hypochlorous acid in the zone of anode 14 is supplied to the second reactor 7 through seventh conduit means 16. Although the embodiment shown in FIG. 1 includes the electrolysis device 12 in the form of one unit wherein alkaline aluminic acid solution is formed in the zone of aluminum cathode 13 and hypochlorous acid solution is produced in the zone of carbon anode 14, the device may alternatively comprise two separate units, i.e., a first electrolysis unit having the aluminum cathode 13 in the zone of which alkaline aluminic acid solution is formed, and a second electrolysis unit having the carbon anode 14 in the zone of which hypochlorous acid solution is produced.

A third electrolysis device 17 has an aluminum cathode 18 and an iron, manganese and like metal anode 19 to electrolize an electrolyte such as an aqueous solution of common salt, sodium sulfate solution or the like. As electrolysis proceeds, the solution in the zone of anode 19 of the device 17 produces hydrochloric acid or is acidified with sulfuric acid, permitting the metal of the anode 19 to dissolve into the solution and to thereby release its ions thereinto. The solution containing the metal ions in the zone of anode 19 is sent to the second reactor 7 through ninth conduit means 20. As is the case with the electrolysis device 12, the solution in the zone of cathode 18 is converted to an alkaline aluminic acid solution, which is supplied to the first reactor 1 through 10 conduit means 21.

At the cathodes 13 and 18 of the first electrolysis device 12 and third electrolysis device 17, hydrogen gas is produced which is recovered or released into the air after being burnt. The electrolytic cells of the first electrolysis device 12 and third electrolysis device 17 are each divided into zones of anodes 14 and 19 and those of cathodes 13 and 18, respectively, by partition screens 22. Furthermore, the voltage and amperage of the current applied to each of the first electrolysis device 12 and third electrolysis device 17 are adjustable. Preferably, the voltage and amperage are adapted to be automatically controllable in accordance with the amount of waste gas and the concentration of acid gas therein determined by measuring.

The pH of the solution in the second reactor 7 is adjusted with sodium hydroxide, sodium carbonate, caustic potash, ammonia water, or like alkali supplied from a tank 23 through eighth conduit means 24. Acid gas, particularly such as sulfurous acid gas or nitrogen monoxide gas, is oxidized with the hypochlorous acid in the solution supplied from the first electrolysis device 12 in an alkaline atmosphere and in the presence of metal ions acting as a catalyst which ions are contained in the solution supplied from the third electrolysis device 17. The solution containing the metal ions and hydroxides of metals such as $Fe(OH)_3$ and $Mn(OH)_2$ resulting from the addition of sodium hydroxide or like alkali is sent from the second reactor 7 to a coagulating device 25 through the sixth conduit means 9. The pH of the solution in the coagulating device 25 is adjusted with the alkali supplied from the tank 23 through the 13 conduit means 26, whereby the metal ions contained in the solution are all deposited in the form of hydroxides. The solution obtained in the coagulating device 25 and containing the hydroxides is then fed through the sixth conduit means 9 to the dust remover 10, in which the solution is brought into contact with the waste gas to remove dust efficiently, utilizing good absorbent properties of the metal hydroxides.

The embodiment shown in FIG. 2 will now be described, wherein the parts which serve the same purposes as those in FIG. 1 are referred to by the same numerals and will not be described in detail.

Figure 2:
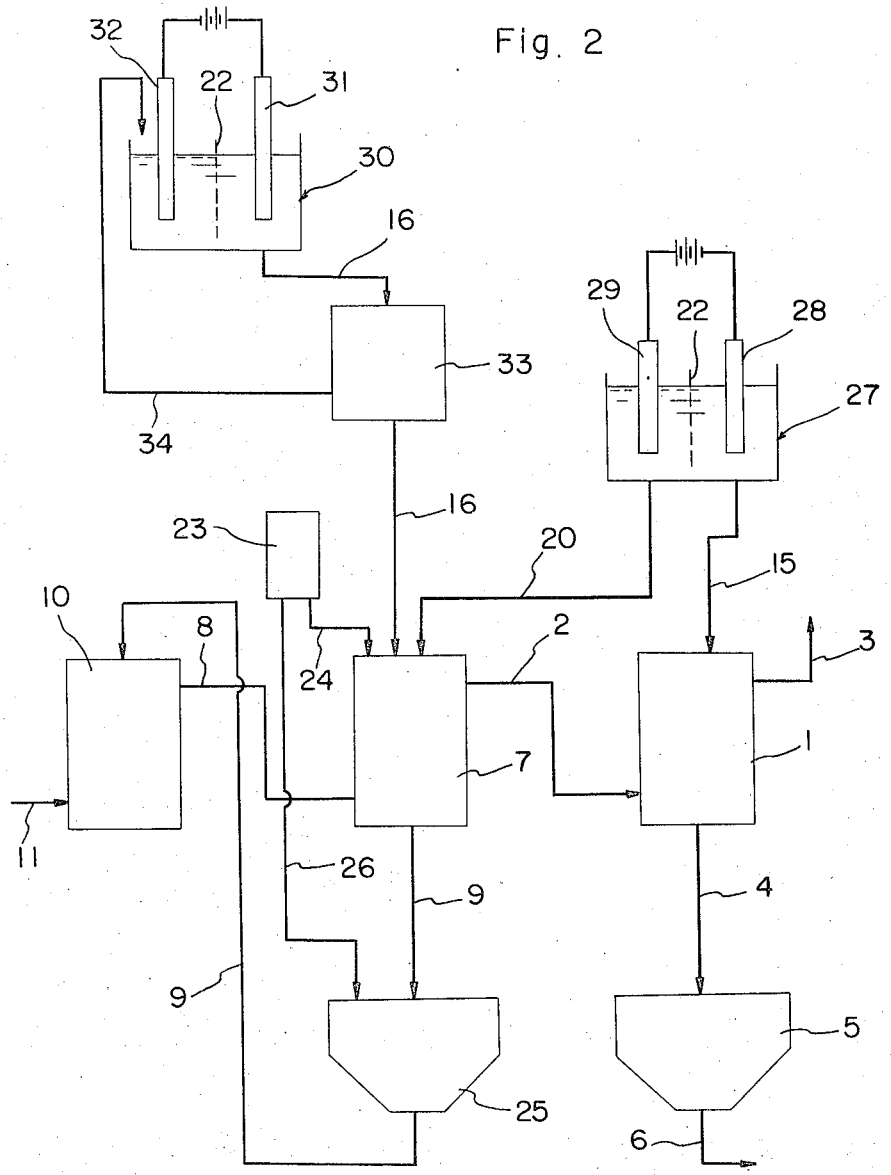
FIG. 2 is a flow sheet showing another embodiment of the apparatus according to this invention.

With reference to FIG. 2, a first electrolysis device 27 has an aluminum cathode 28 and an iron, manganese or like metal anode 29 for the electrolysis of common salt water, sodium sulfate or the like. As electrolysis proceeds, an alkaline solution of aluminic acid is produced in the zone of cathode 28 of the first electrolysis device 27 as in FIG. 1 and is fed to a first reactor 1 through fourth conduit means 15. Like the third electrolysis device 17 in FIG. 1, the solution in the zone of anode 29 is turned to a metal ion-containing solution, which is supplied to a second reactor 7 through ninth conduit means 20. Although the electrolysis device 27 in the embodiment of FIG. 2 is in the form of one unit in which an alkaline aluminic acid solution is produced in the zone of cathode 28 and the zone of anode 29 produces a solution containing metal ions, the device may alternatively comprise a separate first electrolysis unit and third electrolysis unit as is the case with FIG. 1.

A second electrolysis device 30 includes a lead dioxide anode 31 and a lead cathode 32, or a platinum anode 31 and a lead or carbon cathode 32 for the electrolysis of a solution of mixture of ammonium sulfate and sulfuric acid. Through electrolysis, the electrolyte in the zone of anode 31 is turned to a solution of mixture of ammonium peroxodisulfate and sulfuric acid. This solution of mixture is sent through seventh conduit means 16 to a separator 33, in which hydrogen peroxide is separated from ammonium peroxodisulfate. The separated hydrogen peroxide is fed to the second reactor 7 through the seventh conduit means 16. On the other hand, the solution of mixture of ammonium sulfate and sulfuric acid resulting from the separation of hydrogen peroxide is returned to the second electrolysis device 30 through fourteenth conduit means 34. As in the case of FIG. 1, the voltage and amperage of the current applied to each of the first electrolysis device 27 and the second electrolysis device 30 are controllable. The hydrogen gas generated in the zone of cathode 28 of the first electrolysis device 27 may be recovered or released into the air after being burnt.

Like the embodiment of FIG. 1, sulfurous acid gas or nitrogen monoxide gas is oxidized in the second reactor 7 with the hydrogen peroxide supplied from the second electrolysis device 30 in an alkaline atmosphere and in the presence of metal ions acting as a catalyst which ions are contained in the solution supplied from the first electrolysis device 27. Furthermore even when the hydrogen peroxide supplied from the separator 33 to the second reactor 7 contains ammonium sulfate and sulfuric acid, the ammonium sulfate and sulfuric acid can be utilized for the removal of nitrogen monoxide if it is contained in the waste gas. More specifically, when made to react with ammonium sulfate and sulfuric acid in the presence of chlorine, nitrogen monoxide is coverted to ammonium nitrite, ammonium nitrate, ammonium chloride or nitrogen gas which can be readily captured with aluminum hydroxide in the first reaction 1.

The electrolysis devices 12, 17 and 27 included in the embodiments of FIGS. 1 and 2 for forming aluminic acid ions may be of any construction insofar as aluminic ions can be produced, for example, an electrolysis device having an iron cathode and a platinum, stainless-steel, lead, or aluminum anode, and a solution of common salt, sodium sulfate solution, or the like as the electrolyte. Furthermore in the case of FIG. 1, only one of the first electrolysis device 12 and third electrolysis device 17 may be used in practicing this invention. Fragments of aluminum may also be utilized using a cageshaped electrode to produce aluminic acid ions.

Each of the first to 14 conduit means described in the specification may be selected from steel and plastic pipe, or other pipe with an acid- and alkaline-proof coating therein. A pump may be associated with the conduit means, and various kinds of vessels operated mechanically or manually may be used as the conduit means for conveying solution.

What we claim is:

1. An apparatus for removing acid gas from waste gas comprising:
   a first reactor for reacting the form a gas with an alkaline solution of aluminic acid to form a reaction product of the acid gas and aluminum, the first reactor being connected to first conduit means for introducing the waste gas into the reactor, second conduit means for discharging the waste gas after the acid gas has been removed therefrom and third conduit means for discharging the reaction product from the reactor,
   a first electrolysis device having an aluminum cathode to convert electrolyte in a cathode zone to an alkaline solution of aluminic acid as electrolysis proceeds, and fourth conduit means for introducing into the first reactor the alkaline aluminic acid solution produced in the first electrolysis device.

2. The apparatus as set forth in claim 1 which further comprises:
   a second reactor connected to the first reactor by the first conduit means, the second reactor being connected to fifth conduit means for introducing the waste gas thereinto and sixth conduit means for discharging a residue remaining therein after the reaction,
   a second electrolysis device having an anode to convert electrolyte in the anode zone to one of solution of hypochlorous acid and solution of hydrogen peroxide as electrolysis proceeds,
   seventh conduit means for introducing into the second reactor the hypochlorous acid solution or hydrogen peroxide solution produced in the second electrolysis device, and
   eighth conduit means for introducing an alkali into the second reactor, so that the sulfurous acid gas and nitrogen monoxide gas are oxidized in the second reactor to sulfuric acid gas and nitrogen dioxide gas respectively by the hypochlorous acid or hydrogen peroxide in an alkaline atmosphere;
   whereby the apparatus is particularly suitable in removing waste gas which contains at least one sulfurous acid gas and nitrogen monoxide.

3. The apparatus as set forth in claim 2 wherein the first and second electrolysis devices are in the form of one electrolysis unit having a carbon-containing anode and an aluminum-containing cathode to electrolyze common salt water; and means for supplying the hypochlorous acid solution from the electrolysis unti to the second reactor.

4. The apparatus as set forth in claim 3 further comprising:
   a third electrolysis device having a metal-containing anode and an aluminum-containing cathode to convert electrolyte in the anode zone to a metal ion-containing solution and electrolyte in the cathode zone to an alkaline solution of aluminic acid respectively as electrolysis proceeds, ninth conduit means for supplying the metal ion-containing solution from the third electrolysis device to the second reactor so that the metal ions promote the oxidizing reaction of sulfuric acid gas and nitrogen monoxide gas in the second reactor, tenth conduit means for supplying the alkaline aluminic acid solution from the third electrolysis device to the first reactor, and a dust remover means for removing solids from the waste gas connected to the second reactor by the fifth conduit means, the waste gas introduced thereinto through 11 conduit means being brought into contact with a solution containing metal hydroxides introduced from the second reactor thereinto through the sixth conduit means.

5. The apparatus as set forth in claim 2 wherein the second electrolysis device is an electrolysis device for electrolizing a solution containing ammonium sulfate and sulfuric acid to convert the electrolyte in the anode zone to a solution containing ammonium peroxidesulfate and sulfuric acid, and including a separator for separating hydrogen peroxide supplied to the second reactor.

6. The apparatus as set forth in claim 5 wherein the first electrolysis device has a metal-containing anode to convert electrolyte in the anode zone to a solution containing metal ions as electrolysis proceeds, and which further comprises:

ninth conduit means for supplying the metal ioncontaining solution from the first electrolysis device to the second reactor so that the metal ions promote the oxidizing reaction of sulfuric acid gas and nitrogen monoxide gas in the second reactor, and a dust remover means for removing soilds from the waste gas connected to the second reactor by the fifth conduit means, the waste gas introduced thereinto through 11 conduit means being brought into contact with a solution containing metal hydroxides introduced from the second reactor thereinto through the sixth conduit means 7. The apparatus as set forth in claim 2 further comprising:

a third electrolysis device having a metal-containing anode to convert electrolyte in the anode zone to a solution containing metal ions as electrolysis proceeds, and ninth conduit means for supplying the metal ion-containing solution from the third electrolysis device to the second reactor so that the metal ions promote the oxidizing reaction of sulfurous acid gas and nitrogen monoxide gas in the second reactor.

8. The apparatus as set forth in claim 5 further comprising a dust remover means for removing solids from the waste gas connected to the second reactor by the fifth conduit means the waste gas introduced thereinto through 11 conduit means being brought into contact with a solution containing metal hydroxides introduced from the second reactor thereinto through the sixth conduit means.

* * * * *